US011785630B1

(12) United States Patent
Tuli et al.

(10) Patent No.: US 11,785,630 B1
(45) Date of Patent: Oct. 10, 2023

(54) SUPPRESSION OF MODULATION ORDER IN RESPONSE TO UPLINK VOICE MUTING

(71) Applicant: Sprint Spectrum L.P., Overland Park, KS (US)

(72) Inventors: Ashish Tuli, Fairfax, VA (US); Krishna Sitaram, Chantilly, VA (US); Hemanth Pawar, Brambleton, VA (US)

(73) Assignee: Sprint Spectrum LLC, Bellevue, WA (US)

( * ) Notice: Subject to any disclaimer, the term of this patent is extended or adjusted under 35 U.S.C. 154(b) by 73 days.

(21) Appl. No.: 17/301,504

(22) Filed: Apr. 5, 2021

(51) Int. Cl.
*H04W 72/542* (2023.01)
*H04W 72/0446* (2023.01)
*H04L 27/00* (2006.01)

(52) U.S. Cl.
CPC ....... *H04W 72/542* (2023.01); *H04L 27/0008* (2013.01); *H04W 72/0446* (2013.01)

(58) Field of Classification Search
CPC ........... H04W 72/085; H04W 72/0446; H04W 72/1231; H04L 27/0008
See application file for complete search history.

(56) References Cited

U.S. PATENT DOCUMENTS

| 10,383,147 | B2 | 3/2019 | Rajagopal et al. | |
| 11,356,387 | B1* | 6/2022 | Shateri | H04L 43/067 |
| 2008/0155087 | A1* | 6/2008 | Blouin | H04L 41/5006 709/223 |
| 2014/0133303 | A1* | 5/2014 | Jia | H04W 4/06 370/232 |
| 2014/0328155 | A1* | 11/2014 | Dhanda | H04L 1/0003 370/215 |
| 2016/0330099 | A1* | 11/2016 | Koo | H04L 43/0894 |
| 2017/0318604 | A1 | 11/2017 | Liu et al. | |
| 2018/0054339 | A1* | 2/2018 | Sun | H04L 5/005 |
| 2018/0054757 | A1 | 2/2018 | Nanri | |
| 2020/0252847 | A1 | 8/2020 | Park | |
| 2022/0182185 | A1* | 6/2022 | Bostrom | H04L 1/1671 |

FOREIGN PATENT DOCUMENTS

| JP | 2009130659 A | * | 6/2009 |
| WO | WO2017097349 | | 6/2017 |

OTHER PUBLICATIONS

Translation of JP-2009130659-A (Year: 2009).*

* cited by examiner

*Primary Examiner* — Nishant Divecha
(74) *Attorney, Agent, or Firm* — McDonnell Boehnen Hulbert & Berghoff LLP

(57) ABSTRACT

A method and system for controlling uplink air-interface communication over an air interface from a given user equipment device (UE) to the access node, where the uplink air-interface communication normally operates with a modulation order corresponding with a most recently determined channel quality of the given UE. An example method includes (i) detecting at least a threshold high rate of uplink voice muting on the air interface, and (ii) responsive to at least the detecting of the threshold high rate of uplink voice muting on the air interface, suppressing the modulation order used for the uplink air-interface communication from the given UE to the access node over the air interface.

20 Claims, 5 Drawing Sheets

```
DETECT AT LEAST A THRESHOLD HIGH RATE OF
UPLINK VOICE MUTING ON AN AIR INTERFACE, WHERE
THE UPLINK AIR-INTERFACE COMMUNICATION
NORMALLY OPERATES WITH A MODULATION ORDER     ⟶ 32
CORRESPONDING WITH A MOST RECENTLY
DETERMINED CHANNEL QUALITY OF A GIVEN UE
```

```
RESPONSIVE TO AT LEAST THE DETECTING, SUPPRESS
THE MODULATION ORDER USED FOR THE UPLINK AIR-
INTERFACE COMMUNICATION FROM THE GIVEN UE TO THE  ⟶ 34
ACCESS NODE OVER THE AIR INTERFACE
```

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Fig. 2

SUPPRESSION OF MODULATION ORDER IN RESPONSE TO UPLINK VOICE MUTING

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/ or other wirelessly equipped communication devices (whether or not user operated), can operate. Further, each access node could be coupled with a core network that provides connectivity with various application servers and/ or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

Further, on the downlink and uplink channels, the coverage of each access node could define an air interface configured in a specific manner to define physical resources for carrying information wirelessly between the access node and UEs.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals that UEs could detect as an indication of the presence of coverage and to establish frame timing, a reference signal that UEs could measure in order to determine coverage strength, and other control signaling such as PRB-scheduling directives and acknowledgement messaging from the access node to served UEs. And on the uplink, certain resource elements could be reserved to carry random access signaling from UEs to the access node, and other control signaling such as PRB-scheduling requests and acknowledgement signaling from UEs to the access node.

OVERVIEW

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of one or more user-plane bearers, each including an access-bearer that extends between the access node and a core-network gateway system providing connectivity with a transport network and each including a data-radio-bearer (DRB) that extends over the air between the access node and the UE.

Once the UE is connected and attached, the access node could then serve the UE with packet-data communications.

For instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs by modulating the data on the subcarriers of resource elements of those PRBs. Further, to facilitate this downlink communication, the UE could regularly monitor every downlink subframe for the presence of any such scheduling directive to the UE. And upon detecting and reading the scheduling directive, the UE could then read the transmitted data from the indicated PRBs.

Likewise, on the uplink, when the UE has packet data for transmission on the transport network, the UE could buffer the data, pending transmission of the data over the UE's DRB to the access node, and the UE could transmit to the access node a scheduling request that carries a buffer status report (BSR) indicating the quantity of data that the UE has buffered for transmission. With the example air-interface configuration, the access node could then allocate uplink PRBs in an upcoming subframe to carry at least some of the data from the UE and could transmit to the UE a scheduling directive indicating those upcoming PRBs. Similarly here, the UE could monitor each downlink subframe for the presence of such a scheduling directive. And upon detecting and reading the scheduling directive, the UE could accordingly transmit the data to the access node in the indicated PRBs, similarly by modulating the data on the subcarriers of resource elements of those PRBs.

For such scheduled downlink or uplink communication on PRBs, the access node and UE could make use of an applicable modulation and coding scheme (MCS), which the access node could select and designate in the scheduling directive that the access node sends to the UE.

In a representative implementation, the MCS could define (i) a coding rate based on the extent of error-correction data would be transmitted together with the user-plane data being communicated and (ii) a modulation scheme having a modulation order that establishes how many bits of data will be carried by each resource element.

Examples of modulation schemes include, without limitation, (i) Quadrature Phase Shift Keying (QPSK), which enables each resource element to represent 2 bits, thereby having a modulation order of 2, (ii) 16 Quadrature Amplitude Modulation (16QAM), which enables each resource element to represent 4 bits, thereby having a modulation order of 4, (iii) 64QAM, which enables each resource element to represent 6 bits, thereby having a modulation order of 6, and (iv) 256QAM, which enables each resource element to represent 8 bits, thereby having a modulation order of 8. Other examples of modulation schemes and modulation orders are possible as well.

In general, it may be most desirable to use the highest-order modulation scheme possible, to support a highest possible data rate of communication over the air interface. However, relatively high-order modulation schemes may not work so well when the UE's air-interface channel quality is relatively poor, as relatively poor channel quality may make it relatively difficult to distinguish between modulated representations of a greater number of bits per resource element.

Therefore, when the access node is going to schedule air interface communication to or from a UE, the access node could select an MCS based on a consideration of the UE's air-interface channel quality and could direct use of that selected MCS. Namely, the access node could select an MCS to use in a given instance based on a most recently determined channel quality of the UE, and the access node could then include in its scheduling directive to the UE an indication of the selected MCS. If and when the UE's channel quality is relatively good, the access node could thus direct use of an MCS having a relatively high-order modulation scheme supporting more bits per resource element. Whereas, if and when the UE's channel quality is relatively poor, the access node could direct use of an MCS having a relatively low-order modulation scheme supporting fewer bits per resource element.

To determine what MCS the access node should designate in its scheduling directive to the UE, the UE could regularly monitor channel quality and provide the access node with channel quality reports, and the access node could have a standard mapping table that maps varying levels of channel quality to various different MCSs. Thus, when the access node is going to schedule air-interface communication with the UE, the access node could refer to the UE's latest channel quality report and determine based on the mapping table what MCS to specify. The access node could then accordingly schedule the communication, directing use of the determined MCS.

Through this process, the access node could schedule various types of communications for various types of UEs. For example, the process could enable wirelessly-equipped smart phones and other computing devices to schedule general Internet communications as well as packet-based real-time media communications such as voice over Internet Protocol (VoIP) communication, streaming video communication, and gaming, among other possibilities.

When a UE engages in a VoIP call, for instance, the UE and a remote entity may exchange packets that carry digitized voice-band audio or that are coded to cause playout of natural background noise during periods of silence in the call. A typical VoIP implementation would have each end of the call generate and transmit VoIP packet at a regular rate, such as one packet every 20 milliseconds. Thus, in the typical implementation, the UE's serving access node may schedule transmission of a VoIP packet over the air from the UE to the access node every 20 milliseconds and may schedule transmission of a VoIP over the air from the access node to the UE every 20 milliseconds.

One technological problem that could arise in such a system is that, when an access node concurrently serves multiple UEs, the energy of transmissions from one or more of the UEs may create uplink interference or noise, and that uplink interference or noise could make it difficult for the access node to successfully receive scheduled uplink transmissions from individual UEs.

For some types of communications, such as general Internet communications for instance, this difficulty in successfully receiving scheduled uplink communications may not be a significant problem, as uplink communications could be retransmitted several times until successful. But the issue becomes worse with latency sensitive communications such as voice communications. With voice communications, failure to quickly and successfully communicate uplink voice packets could result in failure to play out the associated voice at the other end of the call—thus creating breaks in the voice-call audio that could give rise to user experience issues. The failure to communicate voice packets on the uplink, perhaps when such failure lasts for a threshold amount of time (e.g., 300 milliseconds), is known as voice muting.

One possible cause of uplink voice muting could be high uplink interference or noise resulting from UEs transmitting with relatively high-order modulation schemes. As mentioned above, an MCS having a relatively high modulation order may likely support more bits per resource element than an MCS having a relatively low modulation order. However, to help facilitate successful transmission using a higher modulation order, a UE may need to transmit at a higher power level. And that higher uplink transmission power could contribute more to uplink noise or interference, which could in turn result in an increased level of uplink voice muting for other UEs that are engaged in voice calls.

The present disclosure provides a mechanism that may help to address this problem.

In accordance with the disclosure, when an access node detects at least a threshold high rate of uplink voice muting on the access node's air interface, the access node will take action to suppress the modulation order used for uplink air-interface communication from at least one UE to the access node. To suppress the modulation order used by a given UE, the access node could direct the UE to use a lower modulation order than the modulation order that would normally correspond with the most recently determined channel quality of the UE, such as a lower modulation order than a standard mapping table would correlate with that level of channel quality.

Suppressing the modulation order used by one or more UEs for uplink air-interface communication when the access node detects a threshold high rate of uplink voice muting may help reduce the level of uplink noise on the air interface, because each such UE may then use lower transmission power for transmissions than the UE would use absent the suppression. In turn, this reduced level of uplink noise may help reduce or otherwise mitigate the uplink voice muting experienced with respect to one or more other UEs engaged in voice call communication on the air interface.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 2 is an example of a table mapping channel quality index to MCS.

DETAILED DESCRIPTION

As noted above, FIG. 1 is a simplified block diagram of an example network arrangement in which features of the present disclosure can be implemented. It should be understood, however, that the principles disclosed herein could extend to apply with respect to other scenarios as well. Further, it should be understood that other variations from the specific arrangements and processes described are also possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations, among other possibilities.

Figure 1:
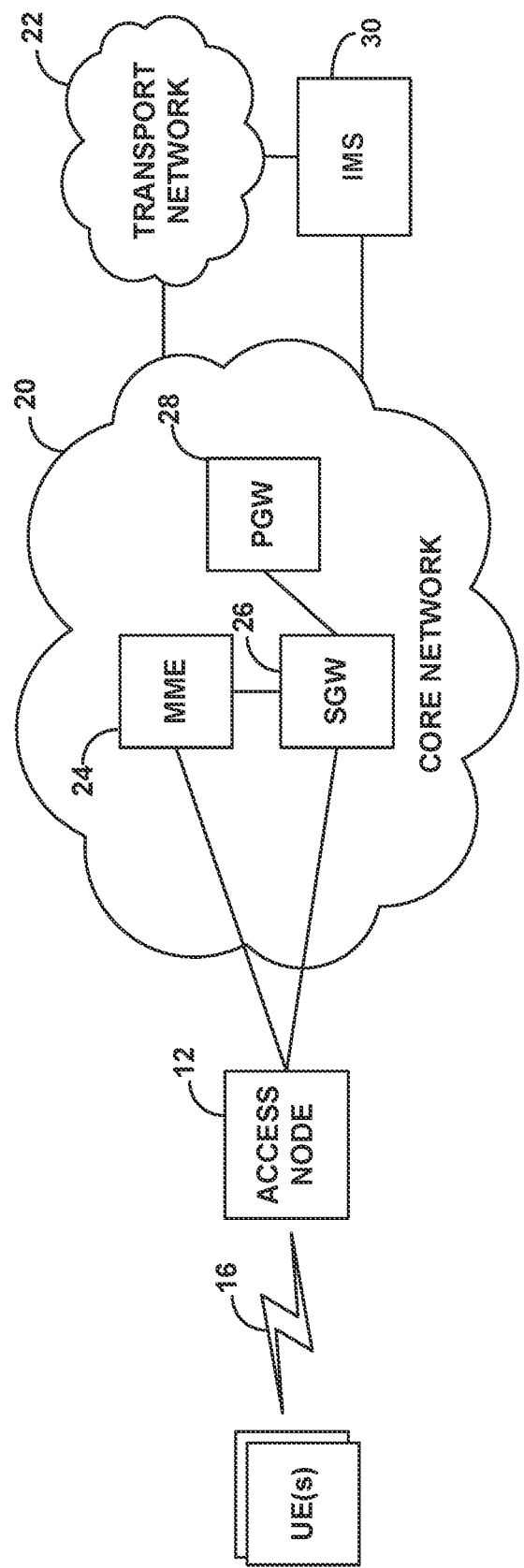
FIG. 1 is a simplified block diagram of an example network arrangement in which features of the present disclosure can be implemented.

FIG. 1 depicts example access node 12, which could be one of many that could be included in the network. The access node 12 could be a macro access node, a small cell access node, or other type of access node, designed to provide wireless coverage in which to serve UEs, and the access node 12 could configured to serve UEs in accordance with one or more defined RATs. Further, the access node 12 could have a respective antenna structure that is configured to transmit and receive electromagnetic signals on a carrier 16 in a region defined by an antenna pattern or radiation pattern, so as to provide one or more coverage areas each on defined frequency and with a defined geographic scope of coverage.

In an example implementation, the access node 12 could be interconnected with one or more core networks 20, which could provide connectivity with one or more external transport networks 22 such as the Internet for instance. Each such core network could take various forms, examples of which include without limitation an Enhanced Packet Core (EPC) network and a Next Generation Core (NGC) network. As shown by way of example, the core network could include a mobility management entity (MME) 24, a serving gateway (SGW) 26, and a packet-data-network gateway (PGW) 28, among other nodes. With this arrangement, the access node 12 could have a communication interface with the MME 24 and with the SGW 26, the MME 24 could have a communication interface with the SGW 26, the SGW 26 could have a communication interface with the PGW 28, and the PGW 28 could provide connectivity with a transport network 22.

As a UE enters into coverage of access node 12, the UE could discover coverage of the access node 12 on carrier 16, such as by reading broadcast signaling from the access node 12 on the carrier, and could then engage in random access and connection signaling with the access node 12 to establish a connection through which the access node 12 could then serve the UE. Further, if the UE is not yet registered for service, the UE could engage in attachment signaling with the MME 24 via the access node 12, and the MME 24 could coordinate setup of one or more user-plane bearers between the UE and the PGW 28, including for each bearer a DRB over the air between the access node and the UE and an access bearer through the core network between the access node and the PGW 28.

In a representative system, each bearer that is established for the UE could have a corresponding defined quality-of-service (QoS) service level, which could be indicated by one or more bearer attributes stored in context records for the UE at entities along the bearer path, such as at the UE, the access node, the SGW 26, and the PGW 28. For instance, each bearer could be associated with a particular QoS Class Identifier (QCI) and/or Differential Services Point Code (DSCP) value that defines various QoS attributes of the bearer, such as packet-delay budget, acceptable packet-loss rate, minimum or maximum bit rate, and the like. Entities along the bearer communication path could then work to handle communications on the bearer accordingly.

The QCI or DSCP value of each such bearer could also correspond with the type or class of data that would be communicated on the bearer. For instance, QCI 1 could denote conversational voice traffic, QCI 2 could denote conversational video traffic, QCI 3 could denote gaming traffic, QCI 4 could denote buffered/streaming video traffic, QCI 5 could denote signaling for setting up and controlling real-time media communications such as voice calls, and other QCIs might denote other sorts of traffic.

With one or more bearers established for the UE, the access node 12 could then serve the UE on the carrier 16, coordinating use of air interface resources such as PRBs to carry data to and from the UE. For instance, as noted above, when the access node receives packet data for transmission to the UE, the access node could select downlink PRBs to carry that data and could transmit to the UE a scheduling directive designating the downlink PRBs, and the access node could then transmit the data to the UE in those downlink PRBs. And when the UE has data to transmit to the access node, the UE could transmit to the access node a scheduling request, the access node could select uplink PRBs to carry the data and could transmit to the UE a scheduling directive designating the uplink PRBs, and the UE could then transmit the data to the access node in those uplink PRBs.

Further, as noted above, the access node 12 and UE could make use of an MCS, which the access node could select per communication based on a most recently determined channel quality of the UE, and which the access node could specify in its scheduling directive to the UE.

To facilitate the access node's selection of an MCS to be used in a given instance, the UE could regularly monitor channel quality and could periodically transmit to the access node a channel-quality-indicator (CQI) value, and the access node could have a standard mapping table that maps varying CQI values to various different MCSs. Thus, when the access node is going to schedule air-interface communication with the UE, the access node could refer to the UE's latest reported CQI and could determine from the mapping table what MCS corresponds with that CQI. And the access node could then specify that determined MCS in the access node's scheduling directive to the UE.

FIG. 2 depicts an example of such a CQI-MCS table, showing CQI index values ranging from 1 up to 15 and MCSs correspondingly ranging from QPSK with a coding rate of 78/1024 up to a 64QAM with a coding rate of 948/1024. In this table, each MCS is thus a combination of modulation type (e.g., ranging from a lowest-order modulation scheme of QPSK to a highest order modulation scheme of 64-QAM) and coding rate (e.g., ranging from 78/1024 to 948/1024), though in other examples the MCS could simply be the modulation type or could take still other forms.

Applying this table, the access node could select an MCS to be used for a next scheduled communication with a UE, with the selection being based on the latest CQI that the access node received from the UE. For example, if the latest CQI that the access node received from the UE was CQI 5, then the access node could determine that the MCS should be QPSK at a coding rate of 449/1024, so the access node could specify this MCS in a message that the access node sends to the UE, and communication could proceed accordingly. Whereas if the latest CQI that the access node received from the UE was CQI 9, then the access node could determine that the MCS should be 16-QAM at a coding rate of 616/1024, so the access node could thus specify this MCS in a message that the access node sends to the UE, and communication could proceed accordingly.

In practice, the access node could serve multiple UEs at once, with the UEs engaging in various types of communications. Some UEs, for instance, might be engaging in general non-voice Internet communications such as web browsing or email communications. While other UEs might be engaged in voice communication such as VoIP call communication.

To facilitate VoIP call communication, the example network as shown in FIG. 1 could include an Internet Multimedia Subsystem (IMS) 30. When a UE seeks to place or receive a VoIP call, the UE could engage in Session Initiation Protocol (SIP) signaling with the IMS 30 to establish a Real-time Transport Protocol (RTP) session through which the UE and IMS 30 could then exchange RTP packets carrying digitized voice-band audio or associated coding. Further, the IMS 30 could also establish a communication session with a remote call party, and the IMS 30 could then bridge that connection with the UE's RTP session, so that the UE and the remote party could then engage in voice-call communication with each other. In addition, in relation to setup of the VoIP call, the MME 24 could coordinate setup for the UE of a QCI-1 bearer over which the RTP packets could flow between the UE and the PGW 28. With this VoIP call and QCI-1 bearer set up, RTP packets could then flow between the UE and IMS 30 and between the IMS 30 and the remote party, with the access node coordinating air-interface transmission of these packets as discussed above.

As mentioned above, when the access node concurrently serves multiple UEs, the energy of transmissions from one or more of the UEs may contribute to uplink noise or interference, which may in turn factor into an increased level of uplink voice muting for other UEs that are engaged in voice calls. In particular, in the example arrangement of FIG. 1, access node 12 could serve multiple UEs at once on carrier 16, and the energy of transmissions from some of those UEs may contribute to uplink noise or interference on carrier 16, which could factor into an increased level of uplink voice muting on that carrier.

In line with the discussion above, to address the problem of uplink voice muting on the air interface, the access node could detect a threshold high rate of uplink voice muting on the air interface and could respond to the threshold high rate of uplink voice muting by adjusting the modulation order used for uplink air-interface communication from at least one UE to the access node over the air interface.

The access node could carry out this process itself, detecting the high level of uplink voice muting and responsively suppressing the modulation order used by one or more UEs that the access node serves. Or another computing system that interworks with the access node could carry out the process, detecting from operational logs the high level of uplink voice muting and responsively directing and thus causing the access node to suppress the modulation order used by one or more UEs that the access node serves. Other arrangements could be possible as well.

In an example implementation, the access node 12 could detect at least a threshold high rate of uplink voice muting on the air interface by monitoring for the absence of expected uplink voice packet (e.g., RTP packet) transmission for a threshold amount of time on various QCI-1 bearers of UEs served by the access node 12.

As noted above, for instance, in a representative VoIP call, the expectation may be that the UE would transmit a voice packet every 20 milliseconds. However, in some cases, the access node 12 may detect that no voice packet is successfully retrieved from the UE within this 20 millisecond time frame. If the access node 12 detects this failure of expected uplink voice packet communication from the UE for a threshold amount of time, then the access node could record that as being an instance of voice muting. For example, if the threshold amount of time is 300 milliseconds, then could detect and detect and record an instance of voice muting as to a UE engaged in a VoIP call by the access node detecting an absence of expected uplink packet communication from the UE for 15 consecutive 20-millisecond periods. Alternatively, the UE, the SGW 26, an Si packet sniffer, and/or any other entity in the QCI-1 bearer path could engage in this monitoring and could inform the access node 12 of the occurrence of one or more such instances of voice muting.

The access node 12 could then regularly track one or more instances of uplink voice muting for one or more UEs served by access node and could regularly monitor a rate of occurrence of such uplink voice muting generally on the access node's air interface (e.g., on carrier 16). Further, the access node 12 could regularly compare this observed rate of uplink voice muting with a predefined threshold rate of uplink voice muting that is deemed high enough to justify adjusting the modulation order used for the uplink air-interface communication. And if and when the access node detects that the rate of uplink voice muting on the access node's air interface is at least as high as the predefined threshold rate of uplink voice muting, the access node could responsively take action to address the situation, by suppressing modulation order of uplink communication from one or more UEs served by the access node.

Note that the observed rate of uplink voice muting could be with respect to just one UE and/or with respect to multiple UEs served over time (whether or not concurrently with each other) by the access node.

Further, note that the act of detecting the threshold high rate of uplink voice muting could be based on current data, such as a just-occurred threshold high rate, and/or could be predictive based on historical records of past communications. In a predictive implementation, for instance, the access node could collect determine from operational records that the rate of uplink voice muting tends to be threshold high at a particular time of day, and the access node could then determine that the current time of day is that particular time of day and could therefore predict that the level of voice muting is likely threshold high and could then responsively take action to suppress modulation order used for uplink communications.

The act of suppressing the modulation order used for uplink air-interface communication could take various forms. In normal practice, for instance, the access node 12 could be provisioned with the CQI-MCS mapping table shown in FIG. 2, which maps CQI indexes 1 to 15 to MCSs from QPSK with a coding rate of 78/1024 up to a 64QAM with a coding rate of 948/1024, and the access node could thus normally select an MCS based on CQI according to that table. Upon detecting a threshold high rate of uplink voice muting, however, the access node could transition to operate in a mode in which the access node selects an MCS having a lower-order modulation scheme than the mapping table correlates with the CQI at issue.

In this mode of operation, when the access node seeks to determine an MCS to be used given a particular CQI, the access node could determine from the standard mapping table what modulation scheme corresponds with that CQI, and the access node could then select the highest-order MCS that has a next lower-order modulation scheme than that determined modulation scheme.

For instance, for a CQI of 8 that would normally correlate with an MCS including a modulation scheme of 16QAM, the access node could select the highest-order MCS that has a modulation scheme of QPSK. So rather than selecting the MCS with 16QAM and coding rate of 490/1024 that would normally correspond with CQI 8, the access node could select the MCS with QPSK and coding rate of 602/1024—as the highest-order MCS that has the next lower-order modulation scheme. And as another example, for a CQI of 10 that would normally correlate with an MCS including a modulation scheme of 64QAM, the access node could select the highest-order MCS that has a modulation scheme of 16QAM. So rather than selecting the MCS with 64QAM and coding rate of 466/1024 that would normally correspond with CQI 10, the access node could select the MCS with 16QAM and coding rate of 616/1024—as the highest-order MCS that has the next lower-order modulation scheme.

Other examples are possible as well. Further, the access node need not necessarily select the highest-order MCS that has the next lower-order modulation scheme but could select any lower-order MCS that has no higher than the next lower-order modulation scheme.

In a scenario where the standard mapping table would normally correlate the most recently determined channel quality of the UE with a first modulation order, the act of suppressing the modulation order used for the uplink air-interface communication could thus involve setting the modulation order to a second modulation order based on the second modulation order being lower than that first modulation order. For instance, the access node could select the second modulation order based on the second modulation order being at least one modulation order lower than the modulation order corresponding with the most recently determined channel quality of the UE. And the act of setting of the modulation order to the second modulation order could be based on that selection by the access node.

Alternatively, the act of suppressing the modulation order could involve setting the modulation order to a second modulation order based on the second modulation order corresponding to a channel quality that is lower than the most recently determined channel quality of the UE. For example, if the UE's most recently reported channel quality corresponds to a CQI index of 10 and a modulation order of 64QAM, the access node could suppress the modulation order by selecting a modulation order corresponding to a lower channel quality than a CQI index of 10. For instance, the access node could suppress the modulation order by selecting an MCS having 16QAM, corresponding to any of CQI indexes 7-9, which are lower than the most recently reported CQI of 10.

In line with the discussion above, after the access node selects the MCS with the suppressed modulation order, the access node could then cause the UE at issue to use the selected MCS by transmitting to the UE an indication of the selected MCS. For instance, the access node could specify the selected MCS in the scheduling directive that the access node sends to the UE. And the UE respond to the control message by using the specified MCS, which would have the suppressed modulation order.

In an example implementation, when the access node detects a threshold high level of uplink voice muting and will work to suppress uplink modulation order in an effort to help address the uplink voice muting issue, the access node could specifically suppress uplink modulation order of one or more UEs that are not engaged in voice-call communication. For instance, in response to the high level of uplink voice muting, the access node could then select one or more UEs served by the access node, with the selecting being based on the one or more UEs being engaged in non-voice communication rather than in voice communication (e.g., based on each such UE not having a QCI-1 bearer) and could suppress the uplink modulation order of each such selected UE. Whereas, the access node could avoid carrying out such suppression with respect to uplink communication of UEs that are engaged in voice communication (e.g., based on each such UE having a QCI-1 bearer).

Figure 3:
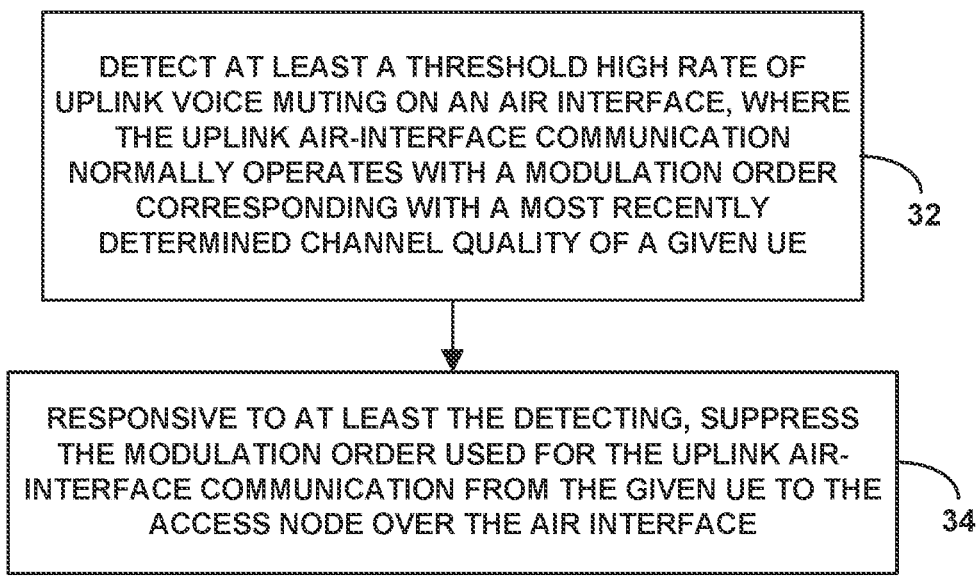
FIG. 3 is a flow chart depicting a method that could be carried out in accordance with the disclosure.

Next, FIG. 3 is a flow chart depicting an example method that could be carried out in accordance with the present disclosure, to control uplink air-communication over an air interface from a given UE to an access node, where the uplink air-interface communication normally operates with a modulation order corresponding with a most recently determined channel quality of the given UE.

As shown in FIG. 3, at block 32, the method includes detecting at least a threshold high rate of uplink voice muting on an air interface, where the uplink air-interface communication normally operates with a modulation order corresponding with a most recently determined channel quality of the given UE. And at block 34, the method includes, responsive to at least the detecting, suppressing the modulation order used for the uplink air-interface communication from the given UE to the access node over the air interface. In some examples, the detecting and suppressing steps of the method could be carried out by the access node.

In line with the discussion above, the method could also include determining that the given UE is engaged in non-voice communication rather than voice-communication, and the suppressing could be additionally responsive to the determining that the given UE is engaged in non-voice communication rather than voice-communication.

Further, detecting at least the threshold high rate of uplink voice muting could comprise detecting one or more instances of uplink voice muting on the air interface and determining that the one or more instances of uplink voice muting have occurred at a rate that is at least as high as a predefined threshold rate. The predefined threshold high rate could be defined as a number of instances of uplink voice muting per unit time and detecting an instance of uplink voice muting on the air interface could comprise monitoring for absence of expected uplink voice muting.

In addition, uplink voice muting on the air interface could comprise absence of expected voice-packet transmission on the air interface for a threshold time period.

Further, as discussed above, the act of detecting the threshold high rate of uplink voice muting on the air interface could be predictive based on historical records of past communications. And the historical records of past communications could indicate a time of day during which a threshold high rate of uplink voice muting on the air interface was detected, and the act of suppressing the modulation order used for air-interface communication over the air interface between the access node and the given UE could be based on a current time of day being the time of day.

Still further, as discussed above, the modulation order corresponding with the most recently reported channel quality could be a first modulation order. And the act of suppressing the modulation order used for the uplink air-interface communication from the given UE to the access node over the air interface could then involve setting the modulation order to a second modulation order selected based on the second modulation order being lower than the first.

And the method could further involve selecting the second modulation order based on the second modulation order being one modulation order lower than the first modulation order, and the setting could be based on the selecting.

Additionally, the method could further include causing the UE to use the second modulation order for the uplink air-interface communication. Further, the method could be carried out by the access node, and causing the given UE to use the second modulation order for the uplink air-interface communication could involve transmitting to the UE a control message to which the UE is configured to respond by using the second modulation order for the uplink air-interface communication.

In further examples, the modulation order corresponding with the most recently reported channel quality is a first modulation order, and suppressing the modulation order used for the uplink air-interface communication from the given UE to the access node could involve setting the modulation order to a second modulation order selected based on the second modulation order corresponding with a channel quality that is lower than the most recently reported channel quality of the UE.

Figure 4:
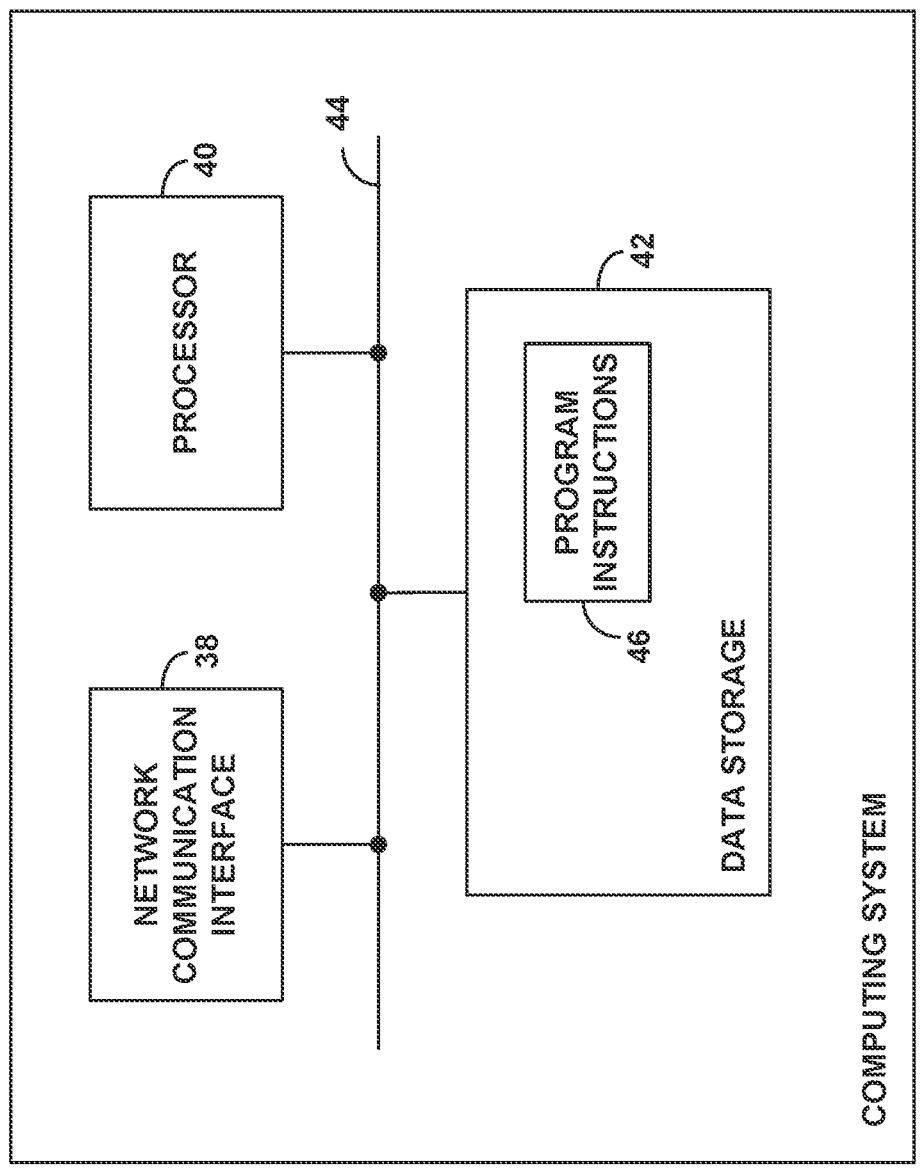
FIG. 4 is a simplified block diagram of an example computing system operable in accordance with the disclosure.

FIG. 4 is next a simplified block diagram of an example computing system that could be operable in accordance with the present disclosure to control configuration of an air interface between an access node and a UE, where the air interface is divided over time into frames and the frames are further divided at least into subframes, and where the air interface operates in accordance with a time-division-duplex configuration that defines at least a number of uplink subframes per frame for communication over the air interface. As noted above, such a computing system could be provided at or more of the entities shown in FIG. 1, among other possibilities.

As shown in FIG. 4, the example computing system includes at least one network communication interface 38, at least one processor 40, and at least one non-transitory data storage 42, which could be integrated together and/or interconnected by a system bus, network, or other connection mechanism 44.

The at least one network communication interface 38 could comprise a physical network connector (e.g., an Ethernet interface) and associated communication logic (e.g., protocol stacks) to facilitate wired or wireless network communication with various other entities. The at least one processor 40 could comprise one or more general purpose processors (e.g., microprocessors) and/or one or more specialized processors (e.g., application specific integrated circuits). And the at least one non-transitory data storage 42 could comprise one or more volatile and/or non-volatile storage components (e.g., magnetic, optical, or flash storage, necessarily non-transitory).

As shown, the at least one non-transitory data storage 42 could then store program instructions 46. These program instructions could be executable by the at least one processor 40 to cause the computing system to carry out various operations described herein, including but not limited to the operations discussed above in relation to FIG. 3.

Various other features discussed herein can be implemented in this context as well, and vice versa.

Figure 5:
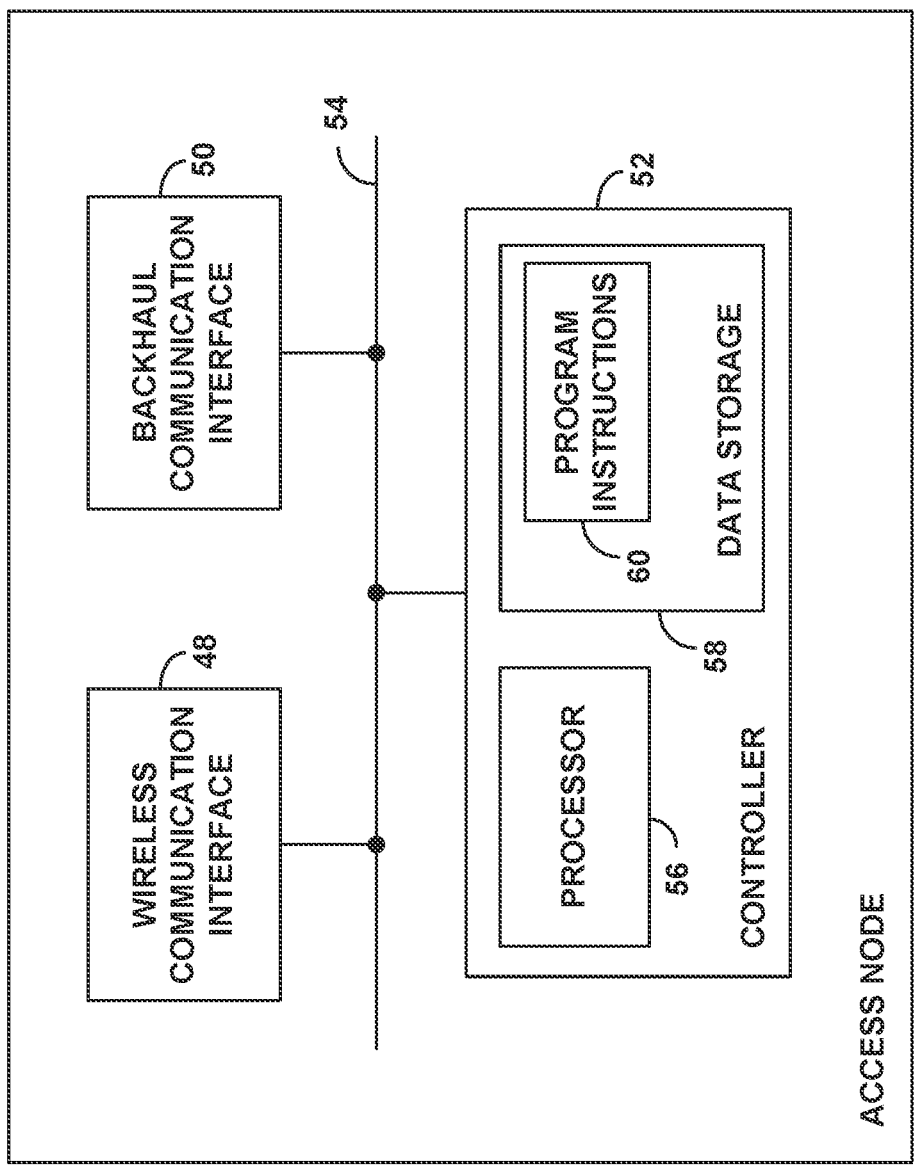
FIG. 5 is a simplified block diagram of an example access node operable in accordance with the disclosure.

FIG. 5 is next a simplified block diagram of an example access node that could be operable in accordance with the present disclosure to control configuration of an air interface between an access node and a UE, where the air interface is divided over time into frames and the frames are further divided at least into subframes, and where the air interface operates in accordance with a time-division-duplex configuration that defines at least a number of uplink subframes per frame for communication over the air interface.

As shown in FIG. 5, the example access node includes at least one wireless communication interface 48, at least one backhaul communication interface 50, and at least one controller 52, all of which could be integrated together and/or communicatively linked together by a system bus, network, or other connection mechanism 54.

In an example implementation, the at least one wireless communication interface 48 could comprise an antenna structure, which could be tower mounted or could take other forms, and associated components such as a power amplifier and a wireless transceiver, so as to facilitate providing coverage on one or more carriers and serving the UE over the air-interface connection. And the at least one backhaul communication interface 50 could comprise network communication interface such as an Ethernet interface, through which the access node engages in backhaul communication.

Further, the at least one controller 52 could comprise at least one processor 56 (e.g., one or more general purpose processors and/or one or more specialized processors) programmed to cause the access node to carry out various operations such as those discussed herein. For instance, the at least one controller 52 could comprise at least one non-transitory data storage 58 (e.g., one or more magnetic, optical, or flash storage components, necessarily non-transitory) which could store program instructions 60 executable by the at least one processor to cause the access node to carry out such operations.

Various other features discussed herein can be implemented in this context as well, and vice versa.

Further, the present disclosure also contemplates a non-transitory computer-readable medium having encoded thereon (e.g., storing, embodying, containing, or otherwise incorporating) program instructions executable to cause a processing unit to carry out operations such as those described above.

Exemplary embodiments have been described above. Those skilled in the art will understand, however, that changes and modifications may be made to these embodiments without departing from the true scope and spirit of the invention.

What is claimed is:

1. A method for controlling uplink air-interface communication over an air interface from a given user equipment device (UE) to an access node, wherein the uplink air-interface communication normally operates with a modulation order corresponding with a most recently determined channel quality of the given UE, the method comprising:
    detecting at least a threshold high rate of uplink voice muting on the air interface, wherein the uplink voice muting comprises uplink voice muting for a plurality of UEs served by the access node; and
    responsive to at least the detecting of the threshold high rate of uplink voice muting on the air interface for the plurality of UEs served by the access node, suppressing the modulation order used for the uplink air-interface communication from the given UE to the access node over the air interface.

2. The method of claim 1, further comprising determining that the given UE is engaged in non-voice communication rather than voice-communication,
    wherein the suppressing is additionally responsive to the determining that the given UE is engaged in non-voice communication rather than voice-communication.

3. The method of claim 1, wherein detecting at least the threshold high rate of uplink voice muting comprises:
    detecting multiple instances of uplink voice muting on the air interface; and
    determining that the multiple instances of uplink voice muting have occurred at a rate that is at least as high as a predefined threshold rate.

4. The method of claim 3, wherein the predefined threshold rate is defined as a number of instances of uplink voice muting per unit time, and wherein detecting an instance of uplink voice muting on the air interface comprises monitoring for absence of expected uplink voice-packet transmission on the air interface from the given UE.

5. The method of claim 1, wherein uplink voice muting on the air interface comprises absence of expected voice-packet transmission on the air interface for a threshold time period.

6. The method of claim 1, wherein detecting at least the threshold high rate of uplink voice muting on the air interface is predictive based on historical records of past communications.

7. The method of claim 6, wherein the historical records of past communications indicate a time of day during which a threshold high extent of uplink voice muting on the air interface was detected, wherein suppressing the modulation order used for air-interface communication over the air interface between the access node and the given UE is based on a current time of day being the time of day.

8. The method of claim 1, wherein the modulation order corresponding with the most recently determined channel quality is a first modulation order, and wherein suppressing the modulation order used for the uplink air-interface communication from the given UE to the access node over the air interface comprises:
    setting the modulation order to a second modulation order selected based on the second modulation order being lower than the modulation order corresponding with the most recently determined channel quality of the UE.

9. The method of claim 8, further comprising selecting the second modulation order based on the second modulation order being one modulation order lower than the first modulation order,
    wherein the setting is based on the selecting.

10. The method of claim 8, further comprising causing the UE to use the second modulation order for the uplink air-interface communication.

11. The method of claim 10, wherein the method is carried out by the access node, and wherein causing the given UE to use the second modulation order for the uplink air-interface communication comprises transmitting to the UE a control message to which the UE is configured to respond by using the second modulation order for the uplink air-interface communication.

12. The method of claim 1, wherein the modulation order corresponding with the most recently determined channel quality is a first modulation order, and wherein suppressing the modulation order used for the uplink air-interface communication from the given UE to the access node over the air interface comprises:
    setting the modulation order to a second modulation order selected based on the second modulation order corresponding with a channel quality that is lower than the most recently determined channel quality of the UE.

13. The method of claim 1, wherein the detecting and suppressing are carried out by the access node.

14. A computing system configured to control uplink air-interface communication over an air interface from a given user equipment device (UE) to an access node, wherein the uplink air-interface communication normally operates with a modulation order corresponding with a most recently determined channel quality of the given UE, the computing system comprising:
    at least one processor;
    non-transitory data storage; and
    program instructions stored in the non-transitory data storage and executable by the processor to carry out operations including:
        detecting at least a threshold high rate of uplink voice muting on the air interface, wherein the uplink voice muting comprises uplink voice muting for a plurality of UEs served by the access node; and
        responsive to at least the detecting of the threshold high rate of uplink voice muting on the air interface for the plurality of UEs served by the access node, suppressing the modulation order used for air-interface communication over the air interface between the access node and the given UE.

15. The computing system of claim 14, wherein the modulation order corresponding with the most recently determined channel quality is a first modulation order, and wherein suppressing the modulation order used for the uplink air-interface communication from the given UE to the access node over the air interface comprises:
    setting the modulation order to a second modulation order selected based on the second modulation order being lower than the modulation order corresponding with the most recently determined channel quality of the UE.

16. The computing system of claim 14, wherein the modulation order corresponding with the most recently determined channel quality is a first modulation order, and wherein suppressing the modulation order used for the uplink air-interface communication from the given UE to the access node over the air interface comprises:

setting the modulation order to a second modulation order selected based on the second modulation order corresponding with a channel quality that is lower than the most determined reported channel quality of the UE.

17. The computing system of claim 14, wherein the operations further comprise determining that the given UE is engaged in non-voice communication rather than voice-communication, wherein the suppressing is additionally responsive to the determining that the given UE is engaged in non-voice communication rather than voice-communication.

18. An access node configured to control uplink air-interface communication over an air interface from a given user equipment device (UE) to an access node, wherein the uplink air-interface communication normally operates with a modulation order corresponding with a most recently determined channel quality of the given UE, the access node comprising:

a wireless communication interface including an antenna structure through which the access node provides service on the air interface;

a backhaul communication interface through which to communicate with other entities; and a controller, wherein the controller is configured to cause the access node to carry out operations including:

detecting at least a threshold high rate of uplink voice muting on the air interface, wherein the uplink voice muting comprises uplink voice muting for a plurality of UEs served by the access node; and responsive to at least the detecting of the threshold high rate of uplink voice muting on the air interface for the plurality of UEs served by the access node, suppressing the modulation order used for air-interface communication over the air interface between the access node and the given UE.

19. The access node of claim 18, wherein the controller comprises a processor, non-transitory data storage, and program instructions stored in the non-transitory data storage and executable by the processor to cause the access node to carry out the operations.

20. The access node of claim 18, wherein the operations further comprise determining that the given UE is engaged in non-voice communication rather than voice-communication, wherein the suppressing is additionally responsive to the determining that the given UE is engaged in non-voice communication rather than voice-communication.

\* \* \* \* \*